United States Patent [19]
Taylor

[11] 3,832,437
[45] Aug. 27, 1974

[54] METHOD FOR FORMING HOLLOW ARTICLES

[76] Inventor: Don A. Taylor, P.O. Box 4, Wadsworth, Ohio 44281

[22] Filed: May 17, 1971

[21] Appl. No.: 143,919

[52] U.S. Cl............ 264/248, 249/63, 249/170, 264/250, 264/295, 264/296, 264/328, 264/334, 264/336, 425/109, 425/324, 425/DIG. 27
[51] Int. Cl............................................. B29h 5/14
[58] Field of Search........... 264/248, 249, 250, 334, 264/295, 296, 336, 328, 96; 425/109, 324, DIG. 27, DIG. 56, DIG. 58; 249/170, 63

[56] References Cited
UNITED STATES PATENTS

| | | | |
|---|---|---|---|
| 1,289,776 | 12/1918 | Mahoney | 264/248 X |
| 1,570,128 | 1/1926 | Carter | 264/248 X |
| 1,575,388 | 3/1926 | Roberts | 264/96 X |
| 2,000,452 | 5/1935 | McChesney | 264/96 X |
| 2,537,089 | 1/1951 | Rempel | 425/116 |

FOREIGN PATENTS OR APPLICATIONS

| | | | |
|---|---|---|---|
| 210,310 | 8/1957 | Australia | 264/248 |

*Primary Examiner*—Robert F. White
*Assistant Examiner*—Thomas P. Pavelko
*Attorney, Agent, or Firm*—John Harrow Leonard

[57] ABSTRACT

Thermally curable material, such as rubber or plastic, is heated and molded under pressure about a mandrel in a split compression mold to form initially a partially cured hollow article with an opening therein through which the mandrel may be withdrawn with little or no elastic deformation or distortion of the article. The opening is defined by aligned molded edges that are spaced apart, but can be pressed together by segmental portions of the mold to close the opening after the mandrel is removed. The initial partial curing is to a degree such that the material can hold its shape in the mold and the edges can fuse and bond together if placed under pressure contact with each other. After the initial curing the mold closing pressure is relieved, the segmental portions of the mold are opened, and the mandrel is withdrawn from the article through the opening and from the mold. Closing pressure is immediately reapplied and the segmental mold portions are operated to force the aligned edges into contact under sufficient pressure to cause them to fuse and bond together in sealing relation. Heating in continued with the mold in this latter operating condition until the material is fully cured. The mold is then opened and the article stripped therefrom. A specialized mold and mandrel are used for forming the aligned edges and for pressing these edges together. Concavities in the cavity wall receive some of the molded material which temporarily hold the article walls in firm contact with the cavity walls during withdrawal of the mandrel. The material in the concavities is stripped free therefrom readily upon stripping the cured article from the mold.

3 Claims, 14 Drawing Figures

PATENTED AUG 27 1974 3,832,437

INVENTOR.
Don A. Taylor,
BY John H. Leonard,
his attorney.

PATENTED AUG 27 1974

INVENTOR.
Don A. Taylor,
BY John H. Leonard
his attorney

METHOD FOR FORMING HOLLOW ARTICLES

BACKGROUND OF THE INVENTION

1. Field of the Invention

A method and apparatus for molding thermally curable plastic material into hollow articles.

2. Description of Prior Art

It is a common practice to mold heat curable plastic material about a mandrel within the cavity of a split pressure type mold into a hollow article having an opening in one side. After the article is fully cured, the mandrel is removed through the opening and then the opening is closed by cementing the defining edges thereof together or by cementing in the opening an insert or closure plug. The opening is made much smaller than the cross section of the mandrel so that the article is as near homogeneous and free from inserts and cemented portions as possible. The material used must have a high degree of resiliency and self-restoring capability far beyond that required for its functioning and durability in the finished article and therefore is very expensive. Its use is necessitated solely because the mandrel generally has a cross section many times the size of the opening and the wall of the article adjacent the opening must be stretched temporarily far beyond its normal condition to enlarge the opening sufficiently to permit removal of the mandrel therethrough.

An example of such hollow articles is a hot water bottle, in the manufacture of which a very wide mandrel is withdrawn through a very small filling opening in the neck of the cured bottle. A preformed plug having a threaded ferrule therein, or having threads molded directly therein, is inserted in the neck and cemented in place. This method of manufacture requires a large number of expensive separate hand operations which must be carefully performed in order to avoid leakage.

In accordance with the present invention the hollow article is molded, and partially cured, in one piece with a large opening therein through which the mandrel can be withdrawn without permanent distortion, and with very limited elastic deformation of the molded shape of the article. The mandrel is withdrawn while the material remains only partially cured, but is set sufficiently so that the material holds its shape in the mold, and is in a state in which it is fusible and bondable into a homogeneous mass by the application of pressure. The opening through which the mandrel is removed is defined by spaced aligned edges molded precisely to shape and which, after removal of the mandrel, can be pressed together while the article remains in the mold in the partially cured and fusible condition and thereby fused and bonded together as the curing is carried to completion. Thus the entire article is homogeneous and free from extraneous synthetic cementitious material and closure plugs and the like.

In the case of a hot water bottle, the entire body including the restricted neck and the portion bearing the ferrule for the stopper are a unitary structure and the material is bonded to the ferrule without the use of any type cement.

Since by this method the opening can be made large enough to permit withdrawl of the mandrel therethrough without appreciable stretch or distortion of the material, much less expensive moldable material may be used than would otherwise be required. This less expensive material is fully adequate for performing its function in the finished article and has the durability in use comparable to that of the very resilient and much more expensive material.

The method is more simple and less costly than prior methods and can be performed with less skilled labor. The mold equipment used can be of less weight than that required in prior methods, thus contributing to more efficient and higher production.

For purposes of illustration, the invention is shown herein specifically as applied to the manufacture of hot water bottles, its advantages in other applications being readily apparent from the illustrative example.

Various objects and advantages will become apparent from the following description wherein reference is made to the drawing in which FIG. 1 is a top plan view showing in assembled relation a split type compression mold, a mandrel, and a core, used in the present method, part of the upper mold section being cut away for clearness in illustration;

Figure 9:
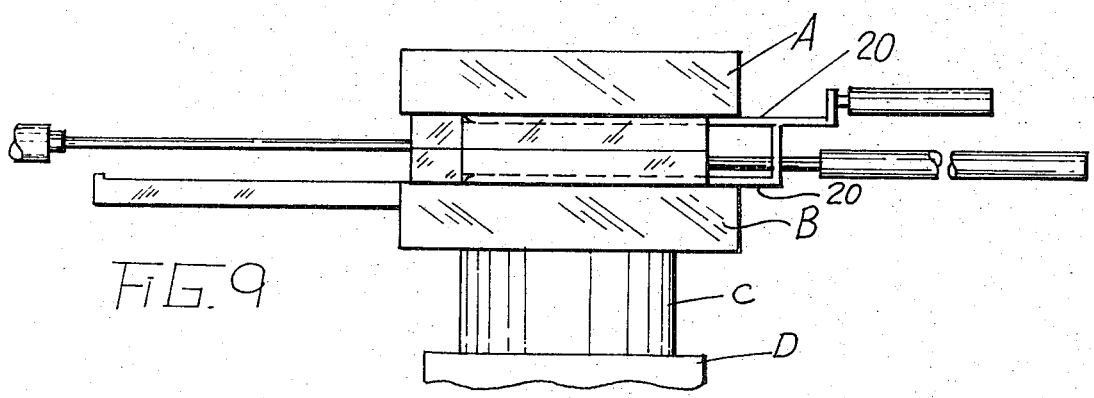
FIG. 9 is a diagrammatic illustration showing the mold installed in a conventional press and various power means for manipulating the mold, the mandrel and the core, respectively.
Figure 10:
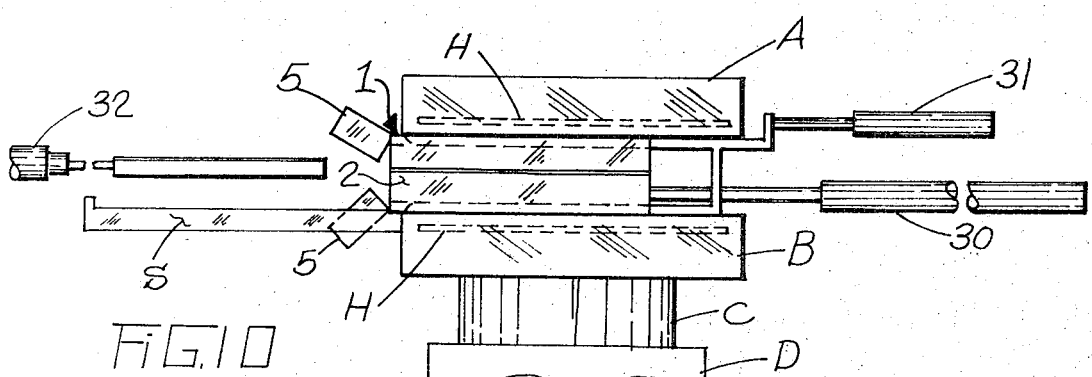
FIG. 10 is a view similar to FIG. 9 showing the segments in open position and the mandrel withdrawn.
Figure 11:
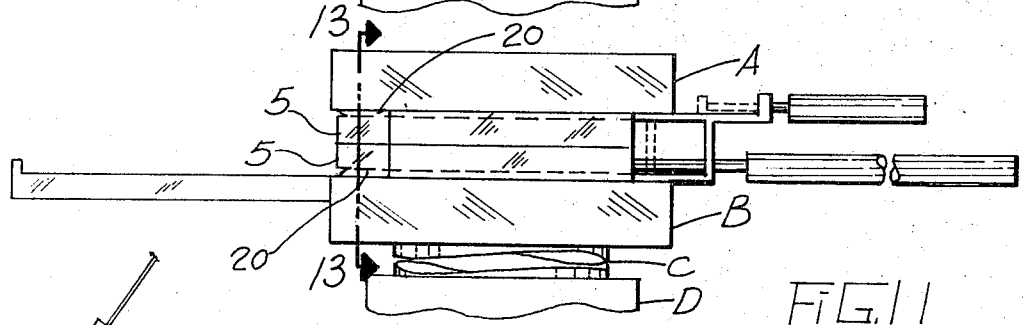
FIG. 11 is a view similar to FIG. 10 with the marginal segments of the mold closed, as indicated in FIG. 8.
Figure 12:
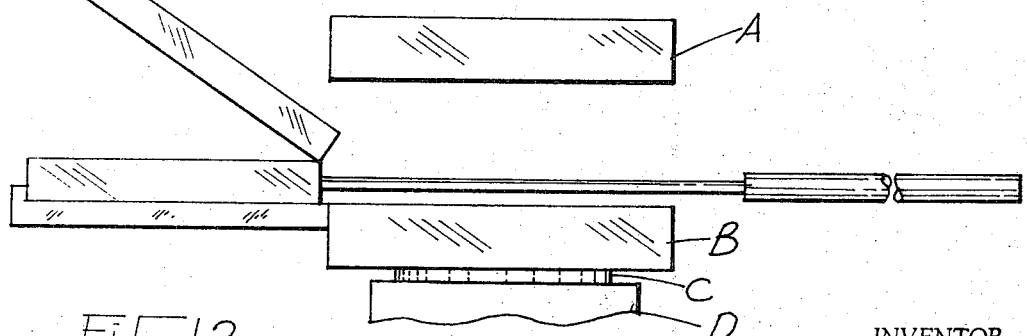
FIG. 12 is a view similar to FIGS. 9 and 10 but showing the mold removed from between the platens of the press and open for the removal of the formed article.
Figure 13:
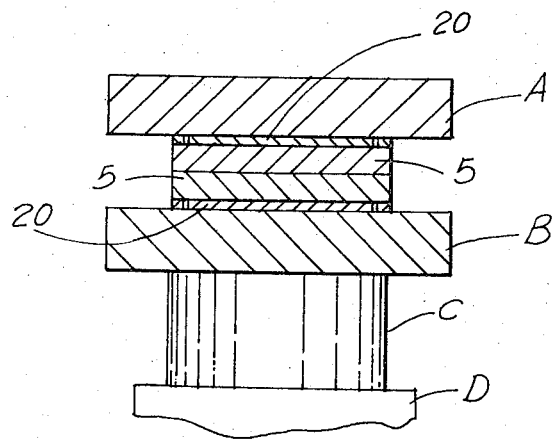
FIG. 13 is a vertical cross sectional view taken on the line 13—13 of FIG. 11.
Figure 14:
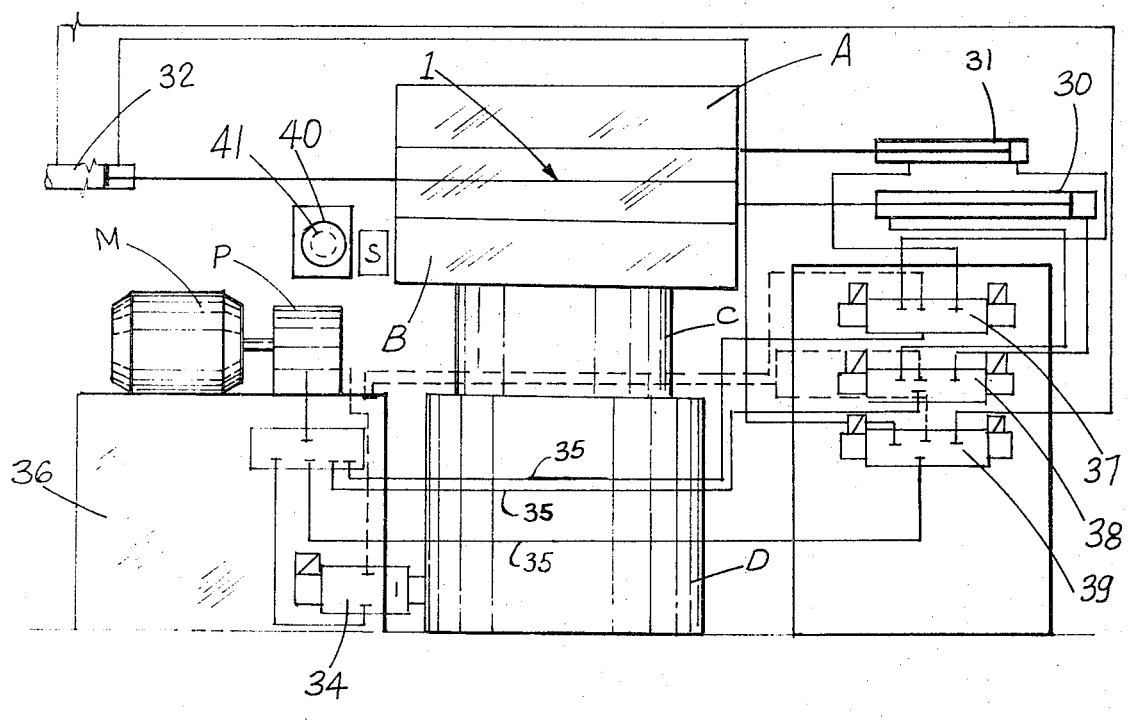
FIG. 14 is a schematic showing of controlled power means for operation of the mold and press, and circuitry and a timer for timing the operations.

Referring first to FIGS. 1 through 8, a split type compression mold, indicated at 1, is shown for purposes of illustration, and is adapted to be closed under pressure by a conventional hydraulic press P, having an upper fixed platen A and lower platen or bed B mounted on a piston C of a reversible hydraulic cylinder D, as indicated in FIGS. 9 through 11.

The mold 1 comprises duplicate companion upper and lower members 2, each of which contains one half of a mold cavity 3. A flash channel 4 surrounds the cavity 3. The mold is one which is charged with uncured material in the plastic sheet form, but injection or other type of split molds may be used.

At one end of the mold 1 both the upper and lower members carry marginal segments 5, each of which is secured in end to end relation to its associated member by suitable links 6. These links 6 are arranged so that the marginal segments 5 can be swung outwardly from the parting line of the mold away from each other to open position and also moved a limited distance endwise of the mold so that, when nearly closed, or closed, they provide a continuation of the mold cavity.

For this purpose, each link 66 is connected by a fixed pivot 7 to its associated segment 5 and is connected to the associated member 2 by a pin 8 which operates in an elongated slot 9 in the link 6.

Removably mounted between the members 2 at the ends opposite from the marginal segments 5 is a core 10 for forming the neck of the hot water bottle. The core 10 is readily removable and installable while the members are in the open position.

At its inner end of the neck core carries a pin 12 which is adapted to receive and detachably hold in proper position a metal or other type of ferrule F which is incorporated in the article by bonding the ferrule to the article by the molded material itself during the molding operation.

The entire core 10 may be mounted on a supporting plate 13 which is movable endwise of, or lifted out of, the mold for withdrawing when the mold is opened.

Supported within the cavity 3 is a mandrel 14. At its inner end, the mandrel 14 is provided with a socket 15 which snugly receives the pin 12 endwise of the mandrel for supporting the inner end of the mandrel firmly in position in properly spaced relation to the walls of the cavity 3. When in final position, the inner end of the mandrel 14 engages the ferrule F for preventing its deflection from proper position under molding pressure.

At its opposite end the mandrel carries a spacing blade 16 which is rigid therewith and which can be clamped between the segments 5 of the members 2 upon movement of the segments 5 partway toward fully closed position, and thereby holds the opposite end of the mandrel 14 fixedly in the proper position in spaced relation to the walls of the cavity 3. The support of the mandrel at opposite ends better prevents its deflection by forces imparted by the material when under molding pressure, and thereby permits the use of lighter weight mandrel.

The blade 16 is of such thickness that, with the upper and lower members 2 closed, and their marginal segments 5 in a position so that their upper and lower outer faces are coplanar with the upper and lower faces of the closed members 2, respectively, the blade 16 is in sealing relation to the inner faces of the segments 5 and prevents escape of the material therebetween. At its inner end of blade 16 has an edge forming portion 17 of reduced thickness. The portion 17 forms also the connection between the blade and the adjacent end of the mandrel 14.

Figure 1:
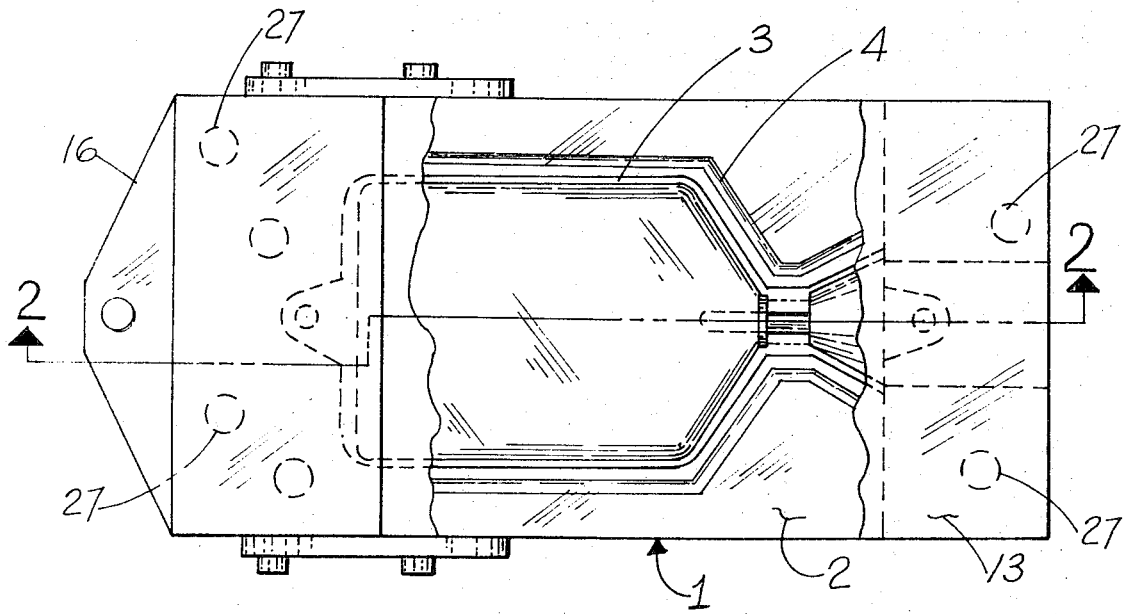
Figure 2:
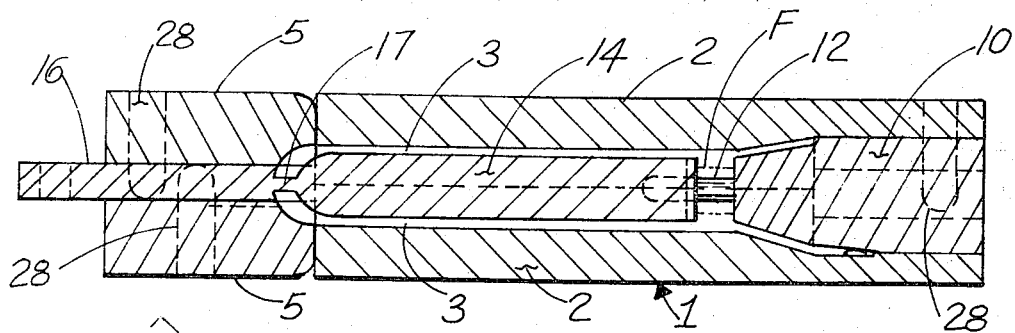
FIG. 2 is a vertical longitudinal sectional view through the structure illustrated in FIG. 1 and is taken on the line 2—2 thereof.
Figure 3:
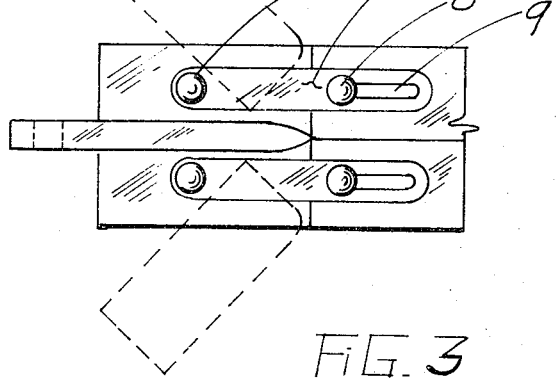
FIG. 3 is a fragmentary front elevation of the mold with the mandrel and its supporting blade in place, and showing the mounting for separable segments of the mold.
Figure 4:
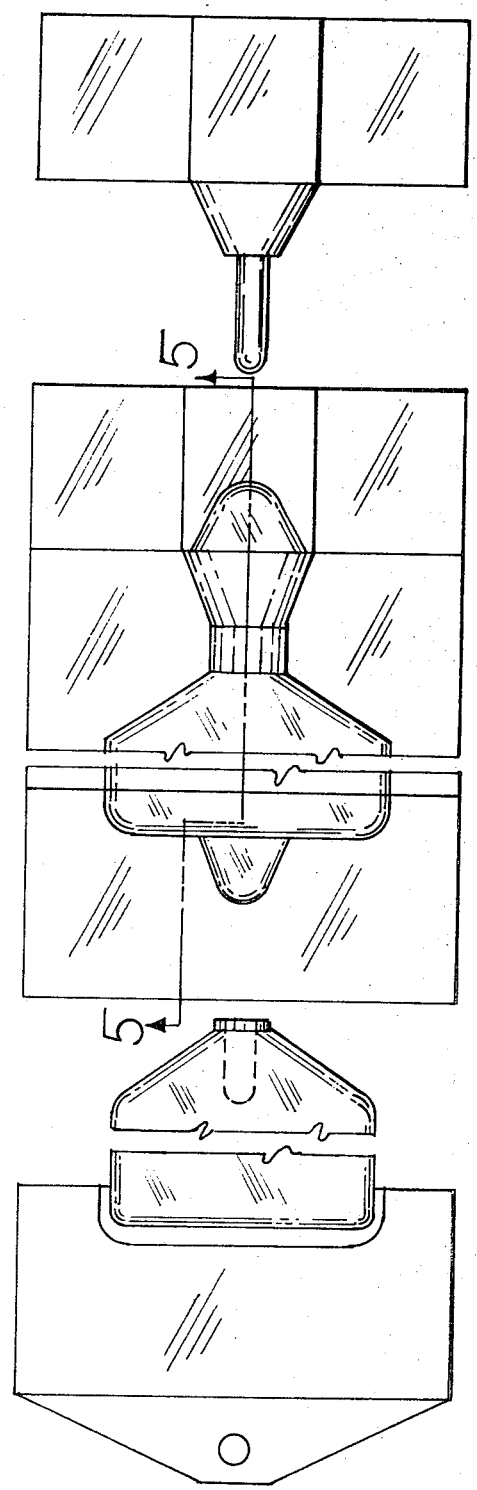
FIG. 4 is an exploded plan view showing the lower section of the mold with the mandrel and its supporting blade and with the neck core, and its support, retracted from the mold cavity.
Figure 5:
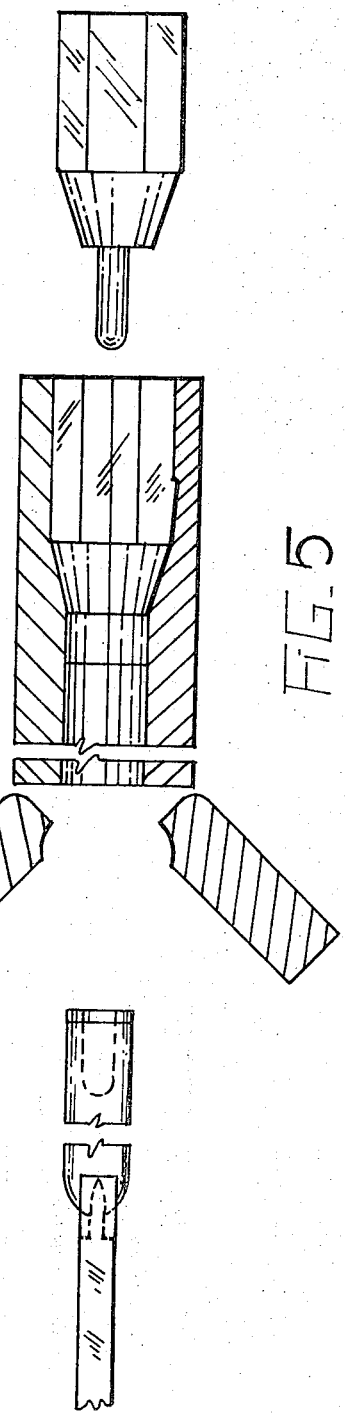
FIG. 5 is a fragmentary vertical longitudinal sectional view through the mold, taken on the line 5—5 in FIG. 4, showing the marginal segments of the mold in open position, the mandrel and its blade and the neck core and its support being shown in elevation.
Figure 6:
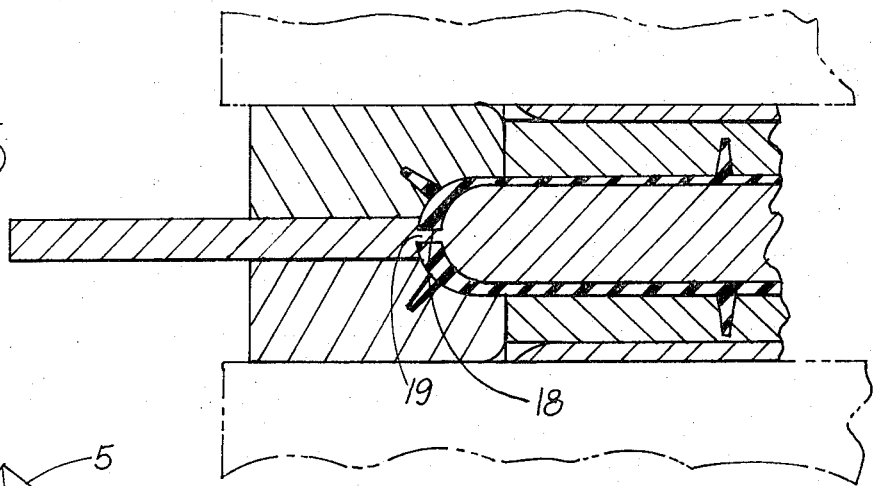
FIG. 6 is a fragmentary vertical longitudinal sectional view of the structure illustrated in FIG. 2, showing the mold in closed position with the molded article in the cavity thereof.
Figure 7:
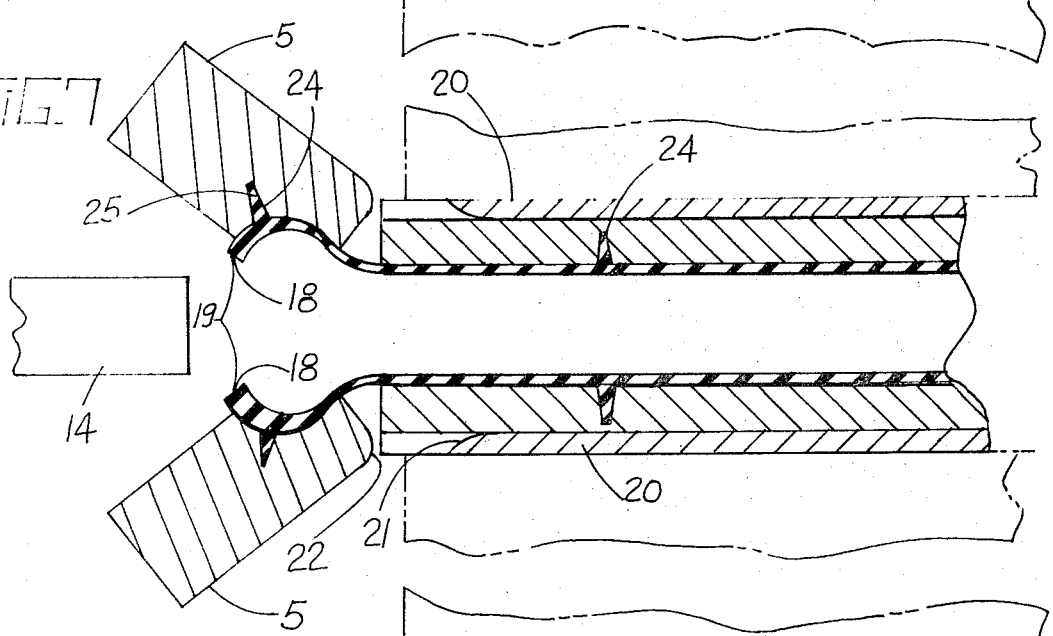
FIG. 7 is a fragmentary view, similar to FIG. 6, showing the separable marginal segments of the mold in open position and the mandrel withdrawn from one end of the mold, and the article open at said one end.
Figure 8:
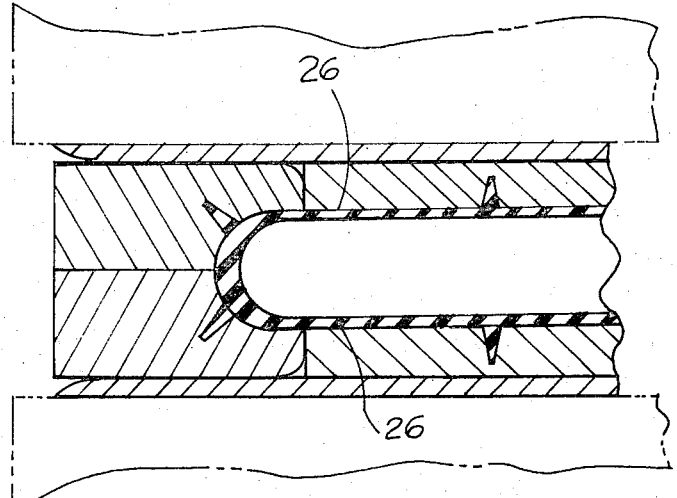
FIG. 8 is a fragmentary view similar to FIG. 7, but with the marginal segments of the mold in final closed position for pressure sealing the open end of the article through which the mandrel has been withdrawn.

The inner end of the blade 16 is contoured to form the end margins of the adjacent end portion of the article for substantially its full width, while the opposite faces of the portion 17 form on the article aligned edges 18 which define an opening 19 into the article extending substantially the full width of the mandrel. The opposite faces of the edge forming portion 17 are spaced from, and at opposite sides of, the parting line. As best illustrated in FIG. 7, the edges 18 extend inwardly of the cavity beyond the mating faces of the segments 5 so that the edges 18 can be engaged and compress each other upon full closure of the segments 5.

As mentioned, the marginal segments 5 are movable toward and away from each other, independently of each other and of the members 2 while the members are open or closed.

OPERATION

With the members 2 open, a plastic sheet of the moldable material is laid in the cavity in the lower member 2, the mandrel 14 and neck core 10 are installed, and another sheet of the material is laid on top of the installed mandrel and core. The members 2 are then closed and concurrently the segments 5 are moved into clamping relation to the blade 16, causing the material to flow and fill the entire cavity 3 except for the portion partially obstructed by the edge forming portion 17 of the blade 16.

The members 2 and their segments 5 transfer heat to the material for curing the plastic material. The heat may be obtained from heating means in the platens of the press.

With the mold charged with the parts assembled in the positions described, the mold is placed between the platens of the press and pressed firmly together while the heating is maintained long enough to partially cure the material, the partial curing to a degree such that the material remains its molded shape effectively, yet is insufficiently cured so that it retains a capability of fusing and bonding under pressure.

While in this partially cured condition, the pressure on the members 2 is relieved and then the segments 5 are opened and the mandrel 14 withdrawn from the mold cavity and from the article through the opening 19 defined by the edges 18. Upon removal of the mandrel 14, the segments 5 are moved toward each other past the position they occupied when the blade 16 was between them to a fully closed position in which they force the aligned edges 18 into firm fusing and bonding contact with each other, in which contact they are held to the completion of the curing cycle.

For closing the segments 5, pressure plates 20 are mounted on the upper and lower surfaces of the members 2 for movement endwise of the mold. The plates 20 are coextensive in width with the members 2. Each plate 20 has a curved cam surface 21 at the end nearest the segments 5, and each segment 5 has a cooperating cam surface 22 facing toward the surface 20 of its associated plate. The plates 20, in their retracted position illustrated in FIG. 7, cover the outer faces of the members 2, except for the segments 5. The thickness is such that pressure applied to the plates 20 closes the members 2 fully while the segments 5 are only partially closed and in clamping engagement with the blade 16. When the mandrel 14 is removed, the plates are advanced so that the cam surfaces swing the segments toward close position and the plates overlie the outer faces of the segments 5 as well as the outer faces of the members 2.

Consequently, when mold closing pressure is reapplied not only are the members 2 fully closed, but also the segments 5 are fully closed so that the parting line of the members 2 and segments 5 are coplanar. In this closed position, the segments 5 have forced the edges 18 defining the opening 19 into pressure contact sufficient to cause the edges to fuse and bond together and close the opening. The segments hold the pressure contact until the completion of the curing cycle.

As a result, the edges 18 are fully fused together without the interposition of any cement or other material than the material of which the article is molded.

The timing cycle depends upon the particular material used. The entire operation can be carried out by hand, but it is preferrable to automate it as hereinafter described.

Here it is to be noted that there is a tendency for the partially molded material to be pulled out of the mold, or distorted or stretched or shifted in position upon withdrawal of the mandrel 14, despite a Teflon coating on the mandrel and the use of parting compounds. Also there is a tendency for the withdrawal to cause the material to lose its firm heat conducting contact with the walls of the cavity 3. In order to guard against these occurrences, the members 2 are provided with concavities or small bores 24 into which part of the material forming the body is forced and molded, during the molding and curing operation, to form restrainers 25. These restrainers 25 frictionally hold the body in the proper position and heat transfer relation to the mold during withdrawal of the mandrel 14 while permitting the body material in the upper and lower cavity portions adjacent the segments 5 to be stretched temporarily elastically during the opening of the segments 5, but not to be permanently deformed. Since the members 2 and segments 5 are immediately closed, the material recovers its shape at the location and remains in firm contact with the die except for a slight pull away from the cavity walls, as indicated at 26 in FIG. 8. Because of this latter phenomenon, allowance can be made in the mold so that this portion of the article is molded initially in slightly deformed shape which is eliminated as the edges 18 are bonded together, to provide the final shape desired in the finished article.

If desired, this manner of interlocking the molded material to the cavity walls can be obtained by designing the article with a surface decoration on the outer wall which is formed by the concavities in the cavity walls, the important feature being that the body has a frictional interlock with the cavity wall during withdrawal of the mandrel 14.

After the molded article is fully cured, the cam plates 20 are moved to an inoperative position and the members 2 and the segments 5 are moved to open position and the article with the core 10 attached, is stripped from the mold. The restrainers 25 strip readily from their concavities 24. The core 10 is then stripped out of the neck and returned to the mold, the mold charged and the mandrel inserted, and the operation repeated.

The blade 16 is provided with conventional holes 27, as also is the support plate 13 of the core. The members 2 carry conventional cooperating dowel pins 28 such that, when the mold is fully closed, the pins 28 enter the holes 27 and assure proper positioning of the core 10 and mandrel 14 relative to the mold cavity and prevents its movement out of position under the molding pressures.

If the method is to be automated such can be done with the equipment illustrated diagrammatically in FIGS. 9 through 11, using, as mentioned, a conventional press P having a stationary upper platen A and a lower platen B. The platen B is mounted on the piston C operable in a cylinder D of the press.

A support S is connected fixed to the platen B and has an upper surface coplanar with the top face of the platen B so that the mold 1 can be slid onto the platen B for closure and molding, and onto the support S for opening and removal of the article. The platens are provided with conventional heating means H for heating the mold to the required temperatures.

The heating means may be steam coils or electric heating elements H incorporated in the platens, the electric heating elements being preferred when extremely precise temperature control is required. Generally, the heating means are set for a particular temperature and remain on continuously throughout the production run.

For sliding the mold 1 into molding position on the platen B, a reversible hydraulic piston and cylinder assemblage 30 is provided and is drivingly connected to the lower member 2 of the mold. A reversible hydraulic piston and cylinder assemblage 31 is connected to the plates 20 for effecting the final closure of the marginal segments 5 of the mold after the mandrel has been withdrawn. A reversible hydraulic piston and cylinder assemblage 32 is provided for pulling the mandrel 14 out of the partially cured article to a position outside of the mold.

The reversible cylinder D of the press is connected through a solenoid operated valve 34 to a motor driven hydraulic pump M. The assemblages 30, 31 and 32 are connected by a suitable pipe line 35 to the pump P, or other source of hydraulic fluid, under pressure, through solenoid operated stop and reversing valves 37, 38 and 39, respectively. The solenoids of the valves 37, 38 and 39 are connected to a source of electric power by suitable conductors through a conventional timer 40, such as the drum type timer illustrated and driven by a motor 41.

As is well known this type of timer can be set to make and break circuits in predetermined timed relation to each other and is used for making and breaking circuits through the solenoids of the solenoid controlled valves.

Thus the timer is adjustable or settable for the intervals required for the various operations through the cycle after which the only operations required are the stripping of the molded article from the mold and the recharging of the mold. Other types of timers and control equipment may be used, the important feature being that when a particular cycle is set up, the timer can be set to operate the controls so as to repeat that cycle with precision as often as required.

The specific structure used for timing the cycle is conventional in itself, the order of cycling only being important in connection with the present invention.

Having thus described my invention, I claim:

1. The method of forming a hollow article from moldable settable material by molding the material about a mandrel in a segmental pressure mold and comprising:

charging with raw moldable material a mold having a cavity shaped to impart a predetermined exterior configuration to the article and in which cavity is disposed a removable mandrel having a shape to impart a predetermined interior configuration to the article; the mold comprising two segments, each segment having a first molding part and a second molding part; said first parts having complementary first parting surfaces, respectively, and the second parts having complementary second parting surfaces, respectively; the first and second parting surfaces of each segment forming a continuous parting surface of the associated segment in the closed position of the segments, the second part of each segment being movable relative to the first part of the associated segment in a direction toward and away from the parting surface of the associated first part so that the parting surfaces of the first parts can be juxtaposed while the second parts are juxtaposed against a portion of the mandrel and held thereby in spaced face to face relation to each other, and the parting surfaces of the second parts can be juxtaposed after removal of the mandrel; and said portion of the mandrel being shaped to impart to the article, while said second parts are juxtaposed against said portion, aligned spaced mateable edges, respectively, from between which the mandrel can be withdrawn from the article while the second parts are opened sufficiently and while, concurrently therewith, the molding pressure is relieved on the first parts, and at least one of which edges, at each aligned unit of the length of said edges, is disposed beyond the adjacent complementary parting surfaces of said second parts after removal of the mandrel, a distance sufficient so that the spaced mateable edges can be juxtaposed in face to face relation under pressure by movement of the second mold parts to closed positions;

closing said first mold parts against each other and the second mold parts against the mandrel, under pressure, so as to confine the material under predetermined pressure in the space between the mandrel and mold segments, and maintaining the first mold parts in closing relation to each other and the material under setting conditions from the instant of initial closure and throughout the entire setting operation, except for an instant while the closing pressure is relieved for withdrawal of the mandrel; and maintaining the second mold parts juxtaposed against the mandrel, and the material under setting conditions from the instant of initial closure and until the material is partially set to a degree such that the material maintains its molded shape and remains in partially set fusible condition and in contact with the mold cavity walls of the segments; relieving the pressure on the first mold parts and opening the second mold parts sufficiently to permit withdrawal of the mandrel through the space between said mateable edges, from the partially set material while the material remains so partially set and fusible and in firm contact with the cavity walls;

promptly thereupon withdrawing the mandrel from the cavity through the space between said aligned mateable edges;

promptly thereafter reapplying the pressure to the first mold parts, and closing the second mold parts against each other under pressure and thereby causing them to move said mateable edges into said face to face contact under sufficient pressure to cause said mateable edges to engage and fuse together and the material to assume the final shape of the article;

retaining the mold segments in closed condition and maintaining controlled setting conditions for a period to fully set the material and permanently fuse and bond the adjacent strata of said mateable edges together in sealing relation while all portions of the article are held in said final molded position in the cavity; and after the material is set, opening the mold and removing the article therefrom.

2. The method according to claim 1 wherein said mateable edge portions, at each aligned unit of their length, are spaced apart a distance less than the distance between the position of the second parts when the second parts are juxtaposed against the mandrel.

3. The method according to claim 1 wherein the partially set article is maintained in firm contact with the wall of the cavity during said partial relief of pressure on the first parts and opening of the second parts and withdrawal of the mandrel, by flowing the introduced raw material, under pressure, into small concavities which are in the walls of the article cavity defined by the mold segments and which are in communication with the cavity, during said initial molding and partial setting operation, and thereby forming on the partially set material integral restrainers detachably frictionally bonded to the mold segments sufficiently to hold the partially set material in contact with the cavity walls against the forces imposed by the mandrel during its removal.

* * * * *

UNITED STATES PATENT OFFICE
CERTIFICATE OF CORRECTION

Patent No. 3,832,437              Dated  August 27, 1974

Inventor(s)  DON A. TAYLOR

It is certified that error appears in the above-identified patent and that said Letters Patent are hereby corrected as shown below:

Abstract - Line 20, for "in" (second occurrence) read --is--.
Col. 3   - Line 23, for numeral "66" read --6--;
           Line 32, delete "of".
Col. 4   - Line 41, after "partial curing" read --being--;
           Line 42, for "remains" read --retains--.

Signed and sealed this 3rd day of December 1974.

(SEAL)
Attest:

McCOY M. GIBSON JR.                C. MARSHALL DANN
Attesting Officer                  Commissioner of Patents